July 10, 1945. J. H. ROETHEL 2,379,924
WINDOW GUIDE
Filed Jan. 8, 1941 2 Sheets-Sheet 1
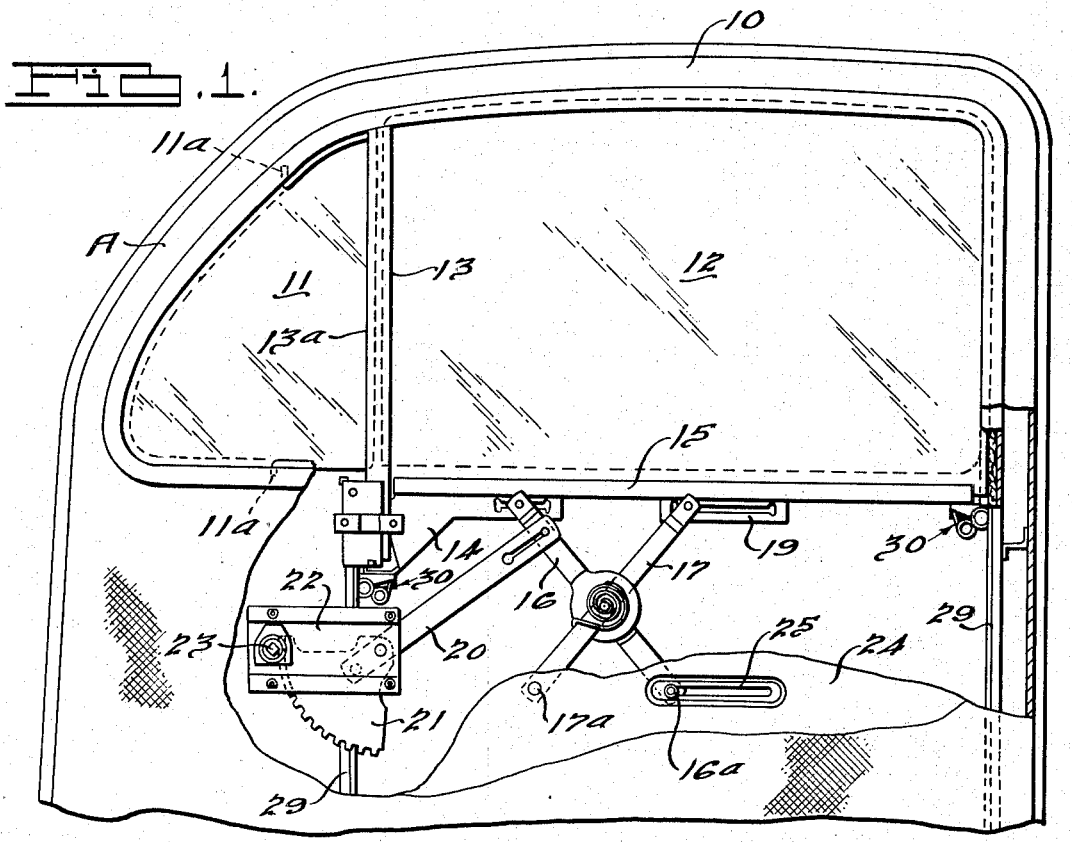
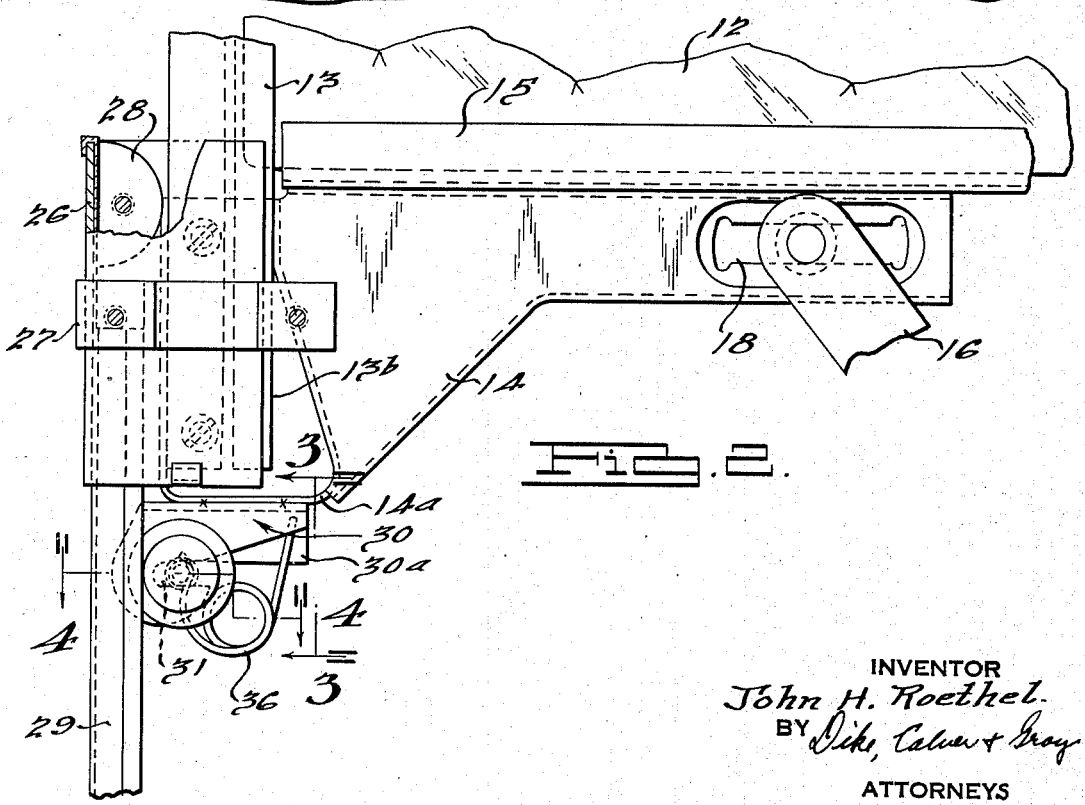
INVENTOR
John H. Roethel.
BY Dike, Calvert & Gray
ATTORNEYS

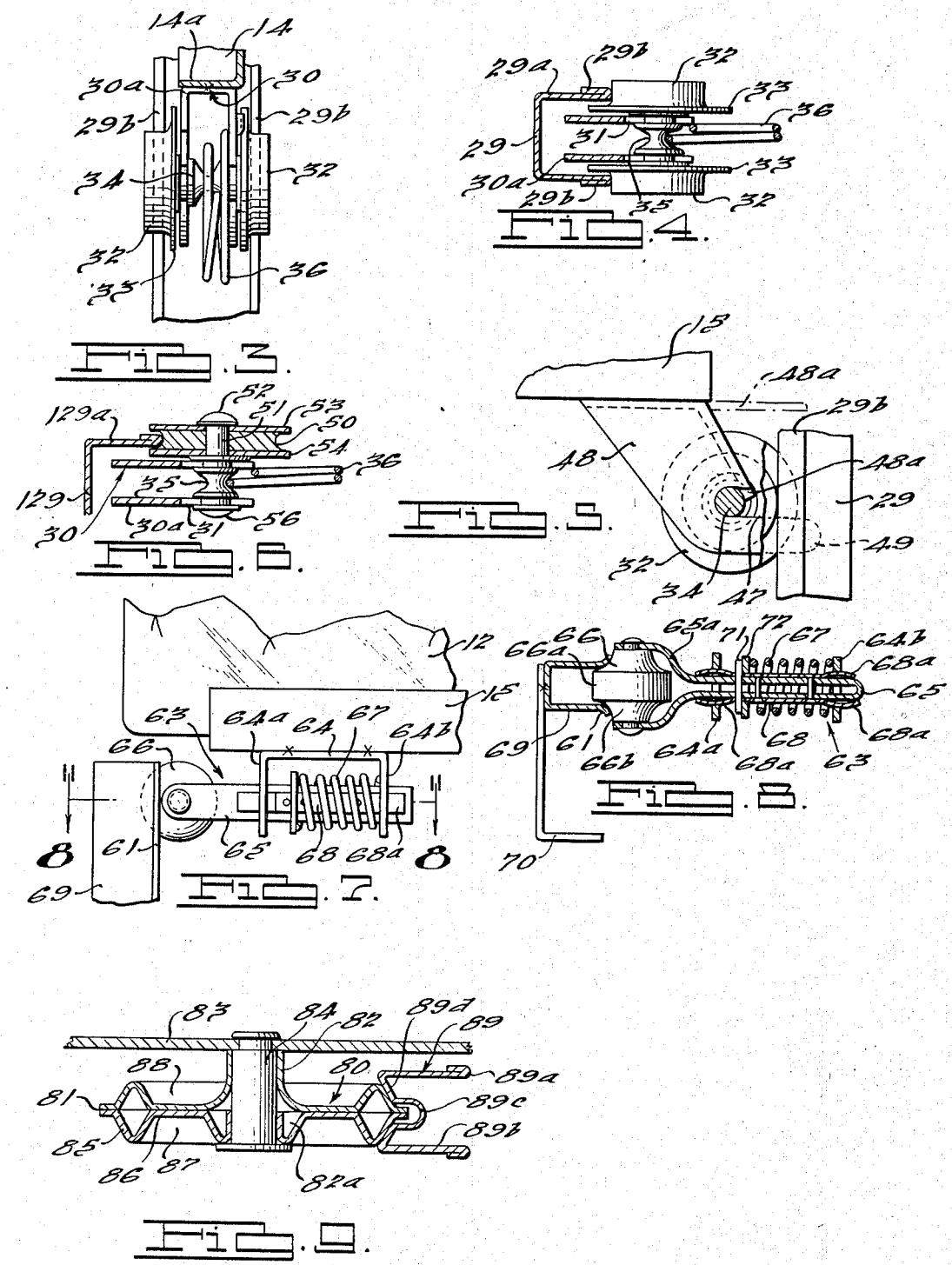

Patented July 10, 1945

2,379,924

UNITED STATES PATENT OFFICE 2,379,924

WINDOW GUIDE

John H. Roethel, Detroit, Mich., assignor to Marvel Equipment Corporation, Detroit, Mich., a corporation of Michigan Application January 8, 1941, Serial No. 373,531

17 Claims. (Cl. 296—48)

This invention relates to means for guiding and controlling glass or transparent panels of windows, particularly windows of automobiles, in which the transparent panels or panes are adapted to be raised and lowered. The invention is especially useful as applied to the window structure for a vehicle body having a window frame provided with a window well formed between inner and outer body or door panels within which the guiding mechanism of the present invention as well as the window regulator mechanism are installed and concealed from view.

This application is a continuation in part of my applications Ser. No. 231,618, filed September 26, 1938, Serial No. 261,448, filed March 13, 1939, now forfeited, and Serial No. 372,901, filed January 2, 1941.

An object of the invention is to provide improved guide mechanism within the window well for the window glass, which mechanism includes devices, such as rollers or shoes, mounted on the bottom of the glass and movably cooperable with fixed upright guides for holding the glass within the well and operating to resist displacement of the glass in directions transverse to the path of movement of the glass when raised and lowered.

One important feature of the invention resides in the provision of guide devices, such as rollers or shoes, at the opposite ends of the bottom of the sliding glass or window panel or at points intermediate the ends of the glass which are constructed and arranged to cooperate at all times and under all conditions with the fixed upright guides within the well whereby inaccuracies in production and in the installation of the guides are readily accommodated, any danger of the guide devices becoming disconnected from the guide is precluded, and at the same time undue frictional resistance to the travel of the window panel is reduced to a minimum.

A further object of the invention is to provide improved guiding means for a vehicle window panel comprising a roller guide device mounted upon and disposed below a channel adapted to be secured to the lower edge of the window panel, said guide device embodying a roller element adapted to travel upon the outer edge portion of the flange structure of a fixed upright guide mounted within the window well and the roller element being so constructed and cooperating in such manner with the guide as to resist transverse displacement of the window panel as the latter is raised or lowered in the window frame.

Another object of the invention is to provide improved means for guiding the window glass into and out of the window opening and window well, which means is relatively simple in construction, capable of effecting substantial savings in material and labor costs, highly efficient in use and effective to permit and facilitate installation of the window glass from the side of the window opening downwardly into the window well.

Other objects of this invention will appear in the following description and appended claims, reference being had to the accompanying drawings forming a part of this specification wherein like reference characters designate corresponding parts in the several views.

Fig. 1 is an inner fragmentary side elevation, partly broken away and partly in section, of an automobile door, such as a front door, embodying the invention.

Fig. 2 is an enlarged fragmentary view of the front guiding means for the sliding glass or window panel.

Fig. 3 is an enlarged sectional view taken substantially through lines 3—3 of Fig. 2 looking in the direction of the arrows.

Fig. 4 is an enlarged sectional view taken substantially through lines 4—4 of Fig. 2 looking in the direction of the arrows.

Fig. 5 is an enlarged fragmentary view illustrating a modified form of a rear guiding means for the sliding window panel of Fig. 1.

Fig. 6 is a view somewhat similar to Fig. 4, illustrating a modified form of guiding means for the window panel.

Fig. 7 is an enlarged detail view illustrating a modified form of guiding means for the window panel.

Fig. 8 is a section taken substantially through lines 8—8 of Fig. 7 looking in the direction of the arrows.

Fig. 9 is an enlarged sectional view illustrating a modified form of guiding means for the window panel.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there are illustrated certain embodiments of the invention applied, by way of example, to a front and a rear automobile door. In Fig. 1 there is illustrated an automobile door A which may be a front door having a window frame 10 including a front sloping pillar and a rear upright pillar, said pillars merging into an upper header to provide a window frame of which the upper portion is in the form of a closed figure defining a window opening. This main window is adapted to be closed by means of a vertically slidable glass or other transparent panel 12 and a laterally swinging glass or other transparent panel 11. The latter panel is of the so-called wing type disposed at the forward part of the window opening and the panels 11 and 12 are preferably arranged so that when in fully closed positions they extend in the same or in substantially parallel planes and cooperate together to close the main window opening. The wing type panel 11 may be pivoted at points 11a so as to swing laterally about an up and down axis. Secured to the forward upright edge of the panel 12 is a channel bar 13 which at its inner side has a projecting lip or overlap flange 13a against which the rear edge of the wing seats when the window is fully closed.

The bar 13 has an extension 13b projecting into the window well below the lower margin of the window opening, this extension being secured as by means of screws to the forward end of a pressed metal bracket 14, this bracket being secured as by spot welding to the bottom forward edge of a channel bar or glass retainer member 15 which embraces the lower edge of the glass panel 12.

Any suitable window regulator may be utilized for raising and lowering the panel 12 and in the present instance, by way of example, there is shown a regulator comprising a pair of crossed intersecting arms 16 and 17 carrying studs at their outer ends adapted to be connected, respectively, within a horizontal slot 18 in the bracket 14 and a horizontal slot in a bracket 19 secured to the bottom of the member 15. In the illustrated regulator the arm 16 is driven through the medium of a swinging arm 20 secured to a gear segment 21 rotatable upon a mounting plate 22. The gear 21 is driven by a pinion on a handle shaft 23, the latter embodying the usual friction clutch for holding the window glass in adjusted position. The lower end of the cross arm 17 is pivoted at 17a to the inner pressed metal door panel 24 and the lower end of the cross arm 16 has a stud 16a slidably connected in a guide slot 25 in the panel 24. It will be understood that the illustrated regulator is but optional and may be replaced by any suitable swinging arm or power driven regulator to suit requirements.

The channel bar 13, which moves downwardly into the window well in conjunction with the panel 12, is guided within the well through the medium of a fixed channel member 26 secured through a bracket 27 to the inner door panel 24. This channel preferably has a felt or similarly lined insert engageable with the opposite side faces of the bar 13. A semi-spherical guide bumper 28 is fastened within the upper end of the channel 26 and positioned to engage the channel bar 13. This bumper guide 28 is preferably formed of non-metallic material such as rubber composition.

Mounted within the window well adjacent opposite ends of the panel 12 are a pair of fixed upright parallel guides 29. Each of these guides in the present embodiment is in the form of a guide channel having parallel side flanges 29a extending inwardly into the window well, the edges of these flanges being folded back and providing parallel tracks or rails. The forward bottom end of the bracket 14 has a horizontal flange portion 14a, and to the bottom of this flange is secured, as by spot welding, the central web of an inverted channel bracket 30 having downturned parallel side flanges 30a. These side flanges are provided with parallel horizontal slots 31 which are open at their ends more remote from the adjacent channel guide 29. The bracket 30 carries a roller element or shoe which in the present instance is formed from a single piece of metal stock. Each roller device comprises a pair of laterally spaced annular roller portions 32 engageable with the edges 29b of the channel guide. Adjacent each roller portion 32 is an annular flange 33 which projects into the channel guide adjacent the inner faces of the flanges 29a. The roller portions 32 are integrally connected by a shaft portion 34 which is turned down centrally at 35 to a relatively narrow diameter, the annular parts of the shaft at opposite sides of the constricted portion 35 being of sufficient diameter to overlap the edges of the slots 31. The constricted portion 35 of the shaft is engaged by one end of a tension spring 36 which may comprise a length of spring wire having one or more intermediate coils, the opposite end of the spring being hooked through an aperture in one of the flanges 30a of the bracket 30.

It will be seen that the forward ends of the flanges 30a of the bracket 30 are adapted to project into the channel guide 29 so that as the roller device 32 is forced rearwardly against the action of the spring 36 by engagement with the track portions of the channel guide, the forward end of the bracket 30 is capable of moving longitudinally within the channel guide. The extent to which the roller may be retracted against the action of the spring may be controlled by the engagement of the bracket 30 with the base of the channel 29. Thus, the roller device 32 is guided longitudinally by the shaft 34 sliding within the slots 31 and the frictional resistance to the rotation of the roller is minimized by engagement of the end of the spring 36 with the constricted annular portion 34 of the shaft.

It will be understood that the opposite end of the window panel 12 of Fig. 1 is guided in similar manner within the window well through the medium of a similar roller guide device, including a channel bracket 30 secured to the bottom of the member 15 and carrying a roller element 32 and resistance spring 36, the roller element travelling in similar manner upon the rear channel guide 29.

If desired, one of the guide rollers in this embodiment may be unsprung as illustrated in Fig. 5. This construction may comprise a channel bracket 48 having its central web spot welded to the bottom of the channel 15 and having depending side flanges formed with parallel horizontal slots 47 opening in the direction of the guide 29. The roller device 32 may be constructed substantially in the manner illustrated in Fig. 4 excepting that the shaft 34 need not be reduced at 35 since in this instance the spring 36 is omitted. The shaft 34 is held within the slots 47 by means of a bent down extension 48a of the central web of the bracket 48, this extension overlying the shaft 34 and preventing disassembly thereof from the bracket after installation. The spaced depending side flanges of the inverted U-shaped bracket 48 are provided with longitudinal guide extensions 49 extending into the channel 29 adjacent opposite sides thereof, in similar manner to the guide extensions 30a of Fig. 4, thus serving to prevent the roller device from becoming disconnected from the channel guide in the event of extreme retraction of the roller.

In Fig. 6 there is illustrated a roller guide structure which may be substituted for the guide structure of the previous embodiments. In this instance a single angle guide 129 is substituted for the double angle or channel guide 29, having an inturned flange 129a terminating in a track or rail engaged by the grooved periphery of a roller 50 fastened to one end of a cross shaft or stud 51. Between the head 52 of the stud and the roller is a washer 53 and at the opposite side of the roller is a similar washer 54, these washers serving to assist in preventing the roller from jumping off the flange 129a. If desired the washers 53 and 54 may be integral flanges on the roller 50. The shaft 51 slides back and forth longitudinally and horizontally in the slots 31 of the bracket flanges 30a as in the case of the embodiment of Fig. 4 and the spring 36 engages the constricted portion 35 of the shaft in similar manner as in Fig. 4. The shaft is guided in the slots 31, as in Fig. 4, by the intermediate larger diameter portions of the shaft overlapping the inner edges of the slots and washers on the shaft overlapping the outer edges of the slots, as shown, the end of the shaft remote from the roller terminating in a head 56.

In the embodiment illustrated in Figs. 7 and 8 of the invention the window glass 12 is also guided within the window well at opposite ends thereof independently of the opposite upright edges of the glass itself. Guide devices, generally indicated at 63, are mounted upon the bottom of the glass retainer channel 15 at opposite ends of the glass or at intermediate points if a center type guide is used, such as disclosed in my co-pending application Serial No. 359,520. Each guide device 63 in the present instance comprises a U-shaped bracket 64 spot welded to the bottom of the channel at each end thereof, each bracket having depending legs 64a and 64b provided with aligned apertures slidingly receiving a roller supporting member 65. The member 65 may be in the form of a metal strip bent upon itself to provide a shank slidingly extending through the apertures in the parts 64a and 64b. The ends 65a of the strip 65 are spread to receive therebetween a roller 66 rotatable upon a pin extending through the forked ends 65a and riveted thereto. A compression spring 67 is mounted upon the shank 65 between the leg 64b of the bracket and a retainer piece 72 held on the shank by a pin 71. Metal strips 68 may be riveted to opposite sides of the shank 65, these strips having spring end portions 68a extending between the shank 65 and the edges of the apertures in the legs 64a and 64b, thus providing a spring fit and preventing chatter or vibratory noises. The guide roller or shoe 66 of each guide device 63 cooperates with a vertical channel guide 69 mounted through the medium of angle brackets 70 upon an inner door or body panel. Each channel guide 69 has flared parallel transversely curved edges 61 forming tracks engaging the oppositely tapered transversely curved side faces 66b of the roller. The central cylindrical face 66a of the roller thus extends a short distance into the channel 69 and by virtue of this construction, as shown in Fig. 8, the cooperation of the roller extension 66a with the side flanges of the channel guide 69 prevents angular or lateral displacement of the window glass 12 and causes the portions 66b to track at all times on the tapered tracks 61 of the guides. The position of the channel guides 69 is such that when the glass 12 is installed and the rollers 66 move down through the upper open ends of the channels the rollers will be pressed in toward each other, thereby placing the springs 67 under compression. Thus, the window glass 12 will be spring suspended within the window well through the medium of the devices 63 cooperating with the channel guides 69.

Referring to the embodiment illustrated in Fig. 9, the roller 80 comprises two stamped pieces or sections 87 and 88 embossed at 86 to provide abutting faces which are spot welded together. Toward the outer margin of the roller or wheel 80 the stampings have generally V-shaped annular ribs which in the assembled structure form outer converging tapered faces 85 providing spaced annular tracking surfaces for the roller. Extended outwardly from the tapered tracking surfaces 85 and located intermediate thereof is a projecting annular lip or rim 81 formed by the adjacent peripheral edges of the stampings. The hub of the stamping 87 is flanged inwardly at 82a to provide an annular bearing and in like manner the stamping 88 is flanged at 82 to provide an annular bearing in line with the bearing 82a. These flanged portions bear and rotate upon the stud 84 and it will be seen with reference to Fig. 9 that the bearing portions 82 and 82a form a closed pocket surrounding the stud 84 which is adapted to receive grease for lubrication purposes.

The stud 84 which revolubly supports the roller 80 is riveted to the outer end of a supporting member or arm 83 which may be a bracket depending from the glass channel 15 at any desired point in its length or may be a spring pressed swinging arm on a depending carrier secured near the center of the channel 15 as in my co-pending application, Serial No. 372,901, filed January 2, 1941.

The roller 80 is adapted to travel along a fixed upright channel guide 89. The channel guide 89 is formed with a central longitudinal groove or channelway 89c in the central web thereof which extends intermediate the parallel side flanges 89a and 89b. The sides of the groove or channel 89c terminate in spaced flared or reversely tapered tracking surfaces 89d which merge into the spaced side flanges 89a and 89b and provide tracks engaged by the correspondingly tapered rolling surfaces 85 of the roller element 80. In this embodiment it will be understood that the longitudinally spaced channel guides 89 are arranged entirely at the inner side of the window panel.

I claim:

1. A guide structure for a vehicle window panel adapted to be mounted in a window frame for up and down movement, said window frame having a window well, comprising a fixed upright guide adapted to be mounted in the well, said guide comprising a metallic strip providing a pair of substantially parallel flange portions extending longitudinally within the well, said flange portions terminating in substantially parallel spaced tracks, a roller guide device mounted exteriorly of a member adapted to be secured to the bottom of the window panel comprising transverse shaft means, spaced roller portions on the shaft means adapted to run on the tracks, means fixed to and rotatable with the roller portions and overlapping the flange portions adjacent the tracks for maintaining the roller portions and window panel against displacement relative to the guide in a direction transverse to the plane of the panel, a spring urging the roller portions against the tracks, and a support for the shaft means, roller portions and said second named means mounted exteriorly of the upright guide, said spring being carried by the support exteriorly of the guide, and said shaft means and roller portions being carried and guided directly by the support for bodily movement relatively thereto in a longitudinal direction.

2. A guide structure for a vehicle window panel adapted to be mounted in a window frame for up and down movement, said window frame having a window well, comprising a fixed upright guide adapted to be mounted in the well, said guide comprising a metallic strip providing a pair of substantially parallel flange portions extending longitudinally within the well and terminating in substantially parallel spaced tracks, a roller guide device mounted exteriorly of a member adapted to be secured to the bottom of the window panel comprising transverse shaft means, spaced roller portions on the shaft means adapted to run on the tracks, means fixed to and rotatable with the roller portions and overlapping the flange portions adjacent the tracks for maintaining the roller portions and window panel against displacement relative to the guide in a direction transverse to the plane of the panel, a spring urging the roller portions against the tracks and mounted exteriorly of the guide, and a support for the shaft, roller portions and said second named means mounted exteriorly of the upright guide.

3. A guide structure for a vehicle window panel adapted to be mounted in a window frame for up and down movement, said window frame having a window well, comprising a fixed upright guide adapted to be mounted in the well, said guide comprising a metallic channel strip providing a pair of substantially parallel flange portions extending longitudinally within the well and terminating in substantially parallel spaced tracks, a roller guide device mounted exteriorly of a member adapted to be secured to the bottom of the window panel comprising a transverse shaft, spaced rollers on the shaft adapted to run on the tracks, means associated with the rollers and overlapping the flange portions adjacent the tracks for maintaining the rollers and window panel against displacement relative to the guide in a direction transverse to the plane of the panel, a spring urging the rollers against the tracks, and a support for the shaft, rollers and said means mounted exteriorly of the upright guide, said spring having one end engaging the shaft and the opposite end connected to the support exteriorly of the guide, said shaft being mounted to slide bodily a limited distance in horizontal longitudinally extending guide slots in the support.

4. A guide structure for a vehicle window panel adapted to be mounted in a window frame for up and down movement, said window frame having a window well, comprising a fixed upright guide adapted to be mounted in the well, said guide comprising a metallic strip providing a pair of substantially parallel flange portions extending longitudinally within the well and terminating in substantially parallel spaced tracks, a roller guide device mounted exteriorly of a member adapted to be secured to the bottom of the window panel comprising transverse shaft means, spaced roller portions on the shaft means adapted to run on the tracks, a spring urging the roller portions against the tracks, and a support for the shaft means and roller portions mounted exteriorly of the upright guide, said spring being carried by the support exteriorly of the guide, and said shaft means and roller portions being carried and guided directly by the support exteriorly of the guide for bodily movement relatively thereto in a longitudinal direction.

5. A guide structure for a vehicle window panel adapted to be mounted in a window frame for up and down movement, said window frame having a window well, comprising a fixed upright guide adapted to be mounted in the well, said guide comprising a metallic channel strip providing a pair of substantially parallel flange portions extending longitudinally within the well and terminating in substantially parallel spaced tracks, a roller guide device mounted exteriorly of a member adapted to be secured to the bottom of the window panel comprising a transverse shaft, spaced rollers on the shaft adapted to run on the tracks, a spring urging the rollers against the tracks, and a support for the shaft and rollers mounted exteriorly of the upright guide, said spring being carried by the support exteriorly of the guide and having one end engaging the shaft intermediate the rollers and the opposite end connected to the support exteriorly of the guide, said shaft and rollers being carried and guided directly by the support for bodily movement relatively thereto in a longitudinal direction.

6. A guide structure for a vehicle window panel adapted to be mounted in a window frame for up and down movement, said window frame having a window well, comprising a fixed upright guide adapted to be mounted in the well, said guide comprising a metallic channel strip providing a pair of substantially parallel flange portions extending longitudinally within the well and terminating in substantially parallel spaced tracks, a roller guide device mounted exteriorly of a member adapted to be secured to the bottom of the window panel comprising a transverse shaft, spaced rollers on the shaft adapted to run on the tracks, a spring urging the rollers against the tracks, and a support for the shaft and rollers mounted exteriorly of the upright guide, said spring cooperating with the support and said shaft exteriorly of the guide, and said shaft being mounted to slide toward and from the guide exteriorly thereof in a longitudinal direction within spaced parallel guide slots formed in said support.

7. A guide structure for a vehicle window panel adapted to be mounted in a window frame for up and down sliding movement, said window frame having a window well, comprising a fixed upright guide adapted to be mounted in the well, said guide comprising a metallic strip providing a pair of substantially parallel flange portions extending longitudinally within the well and terminating in substantially parallel spaced tracks, a roller guide device mounted exteriorly of a member adapted to be secured to the bottom of the window panel comprising transverse shaft means, spaced roller portions on the shaft means adapted to run on the tracks, a spring urging the roller portions against the tracks, and a support for the shaft means and roller portions mounted exteriorly of the upright guide, said spring being carried by the support exteriorly of the guide, and said shaft means and roller portions being carried and guided directly by the support exteriorly of the guide for bodily movement relatively thereto in a longitudinal direction, said roller device having an annular portion or portions overlapping the inner edges of said flange portions adjacent said tracks.

8. A guide structure for a vehicle window panel adapted to be mounted in a window frame for up and down sliding movement, said window frame having a window well, comprising a fixed upright guide adapted to be mounted in the well, said guide comprising a metallic channel strip providing a base and a pair of substantially parallel flange portions extending longitudinally from the base within the well and terminating in substantially parallel spaced tracks, a roller guide device mounted exteriorly of a member adapted to be secured to the bottom of the window panel comprising transverse shaft means, spaced roller portions on the shaft means adapted to run on the tracks, a spring urging the roller portions against the tracks, a support for the shaft means and roller portions mounted exteriorly of the upright guide, said spring being carried by the support exteriorly of the guide, and said shaft means and roller portions being carried and guided directly by the support exteriorly of the guide for bodily movement relatively thereto in a longitudinal direction, and means fixed to and rotatable with the roller portions and overlapping said flange portions adjacent the tracks for maintaining the roller portions and window panel against transverse displacement relative to the guide.

9. A guide structure for a vehicle window panel adapted to be mounted in a window frame for up and down sliding movement, said window frame having a window well, comprising a fixed upright guide adapted to be mounted in the well, said guide comprising a metallic channel strip providing a base and a pair of substantially parallel flange portions extending longitudinally from the base within the well and terminating in substantially parallel spaced tracks, a roller guide device mounted exteriorly of a member adapted to be secured to the bottom of the window panel comprising a transverse shaft, spaced rollers on the shaft adapted to run on the tracks, a spring urging the rollers against the tracks, a support for the shaft and rollers mounted exteriorly of the upright guide, said spring being carried by the support exteriorly of the guide, and said shaft and rollers being carried by the support for bodily movement relatively thereto in a longitudinal direction, and means on said shaft associated with the rollers and overlapping said flange portions adjacent the tracks for maintaining the rollers and window panel against transverse displacement relative to the guide, said support comprising an inverted channel member having spaced depending side flanges provided with parallel longitudinal slots receiving said shaft and permitting said bodily longitudinal movement of the shaft.

10. A guide structure for a vehicle window panel adapted to be mounted in a window frame for up and down movement, said window frame having a window well, comprising a fixed upright guide adapted to be mounted in the well, said guide comprising a metallic channel strip providing a pair of substantially parallel flange portions extending longitudinally within the well and terminating in substantially parallel spaced tracks, a roller guide device mounted exteriorly of a member adapted to be secured to the bottom of the window panel comprising a transverse shaft, spaced rollers on the shaft adapted to run on the tracks, a spring urging the rollers against the tracks, and a support for the shaft and rollers mounted exteriorly of the upright guide, said spring being carried by the support exteriorly of the guide, and said shaft and rollers being carried by the support for bodily movement relatively thereto in a longitudinal direction, said support comprising an inverted channel member having spaced depending side flanges provided with parallel longitudinal slots receiving said shaft and permitting said bodily longitudinal movement of the shaft.

11. A guide structure for a vehicle window panel adapted to be mounted in a window frame for up and down movement, said window frame having a window well, comprising a fixed upright guide within the window well, said guide comprising a metallic channel strip providing a pair of substantially parallel flange portions extending longitudinally within the well and terminating in substantially parallel spaced tracks, a guide device, a support for the guide device fixed to a member adapted to be secured to the bottom edge of the window panel, said device including a pair of spaced roller portions engaging said tracks, a shaft connecting said roller portions and having a constricted portion intermediate the roller portions, and a spring engaging the shaft at said constricted portion and mounted on said support exteriorly of the guide, said support having horizontal guide slots receiving the shaft for longitudinal movement and said spring resisting said movement.

12. A guide structure for a vehicle window panel adapted to be mounted in a window frame for up and down movement, said window frame having a window well, comprising a fixed upright guide within the window well, said guide comprising a metallic channel strip providing a pair of substantially parallel flange portions extending longitudinally within the well and terminating in substantially parallel spaced tracks, a guide device, a support for the guide device fixed to a member adapted to be secured to the bottom edge of the window panel, said device including a pair of spaced roller portions engaging said tracks, a shaft connecting said roller portions, and a spring engaging the shaft intermediate said roller portions and mounted on said support exteriorly of the guide, said support having horizontal guide slots receiving the shaft for longitudinal movement toward and from said tracks and said spring resisting said movement.

13. A guide structure for a vehicle window panel adapted to be mounted in a window frame for up and down movement, said window frame having a window well, comprising a fixed upright guide adapted to be mounted in the well, said guide comprising a metallic strip providing a pair of substantially parallel flange portions extending longitudinally within the well and terminating in substantially parallel spaced tracks, a roller guide device mounted exteriorly of a member adapted to be secured to the bottom of the window panel comprising roller portions adapted to run on the tracks, a spring urging the roller portions against the tracks, and a support rotatably carrying the roller portions and mounted exteriorly of the upright guide, said spring being carried by the support exteriorly of the guide, and said roller portions being carried and guided directly by the support exteriorly of the guide for bodily movement relatively thereto in a longitudinal direction, said flange portions having turned outer edges providing curved tracks of relatively small area in contact with said rollers.

14. Guiding means for a vehicle window panel adapted to be mounted in a window frame for up and down sliding movement, said window frame having a window well; comprising a channel adapted to be secured horizontally to the lower edge of the window panel, a guide device mounted upon an exterior portion of said channel comprising a supporting member extending below the channel, a roller pressure element, and spring means carried by said supporting member; a fixed upright channel guide within the window well comprising a metal channel strip having spaced flange means adapted to project longitudinally within the well; said roller pressure element adapted to travel upon the outer edge portions of said flange means, said spring means and the supporting member therefor being mounted exteriorly of the flange means and said spring means being adapted to press said element against said edge portions, said element being movable bodily by or against the action of said spring means in a longitudinal direction relatively to the panel and said supporting member, said roller element being disposed principally exteriorly of said guide and having spaced annular portions adapted to track along said edge portions of the guide and also having an integral annular portion or portions projecting between said spaced flange means to resist displacement of the panel in a direction transverse to the plane of the panel.

15. Guiding means for a vehicle window panel adapted to be mounted in a window frame for up and down movement, said window frame having a window well; comprising a channel adapted to be secured horizontally to the lower edge of the window panel, a guide device mounted upon an exterior portion of said channel comprising a supporting member extending below the channel, and a roller pressure element carried thereby; a fixed upright channel guide within the window well comprising spaced flange means adapted to project longitudinally within the well; said roller pressure element adapted to travel upon the outer edge portions of said flange means and disposed principally exteriorly of the guide, said supporting member being mounted exteriorly of the flange means and said roller element having spaced annular portions adapted to track along said edge portions of the guide and also having an annular portion or portions rotatable therewith and projecting between said spaced flange means to resist displacement of the panel in a direction transverse to the plane of the panel.

16. Guiding means for a vehicle window panel adapted to be mounted in a window frame for up and down movement, said window frame having a window well; comprising a channel adapted to be secured horizontally to the lower edge of the window panel, a guide device mounted upon an exterior portion of said channel comprising a supporting member extending below the channel, and a roller pressure element carried thereby; a fixed upright channel guide within the window well comprising spaced flange means adapted to project longitudinally within the well and having oppositely inclined outer edge portions; said roller pressure element being disposed principally exteriorly of the guide and adapted to travel upon the outer edge portions of said flange means, said supporting member being mounted exteriorly of the flange means and said roller element having spaced annular portions adapted to track along said inclined edge portions of the guide and also having an annular portion or portions rotatable therewith and projecting between said spaced flange means to resist displacement of the panel in a direction transverse to the plane of the panel.

17. Guiding means for a vehicle window panel adapted to be mounted in a window frame for up and down movement, said window frame having a window well; comprising a channel adapted to be secured horizontally to the lower edge of the window panel, a roller guide device mounted upon an exterior portion of said channel comprising a fixed supporting member secured to and disposed below the channel and a roller element, a fixed upright guide within the window well comprising a metal strip having a base and flange means adapted to project longitudinally within the well; said roller element adapted to travel upon the outer edge portion of said flange means and disposed principally exteriorly of said guide, means disposed wholly exteriorly of said guide for mounting said roller element upon said supporting member, and said roller element having annular flange means fixed to and rotatable therewith and overlapping opposite sides of the flange means of said guide adjacent the outer edge portion thereof for resisting displacement of the panel in a direction transverse to the plane of the panel.

JOHN H. ROETHEL.